Nov. 29, 1955 W. H. GEDDES 2,725,069
OIL TANK OR LIKE VALVE
Filed Nov. 19, 1951 4 Sheets-Sheet 1
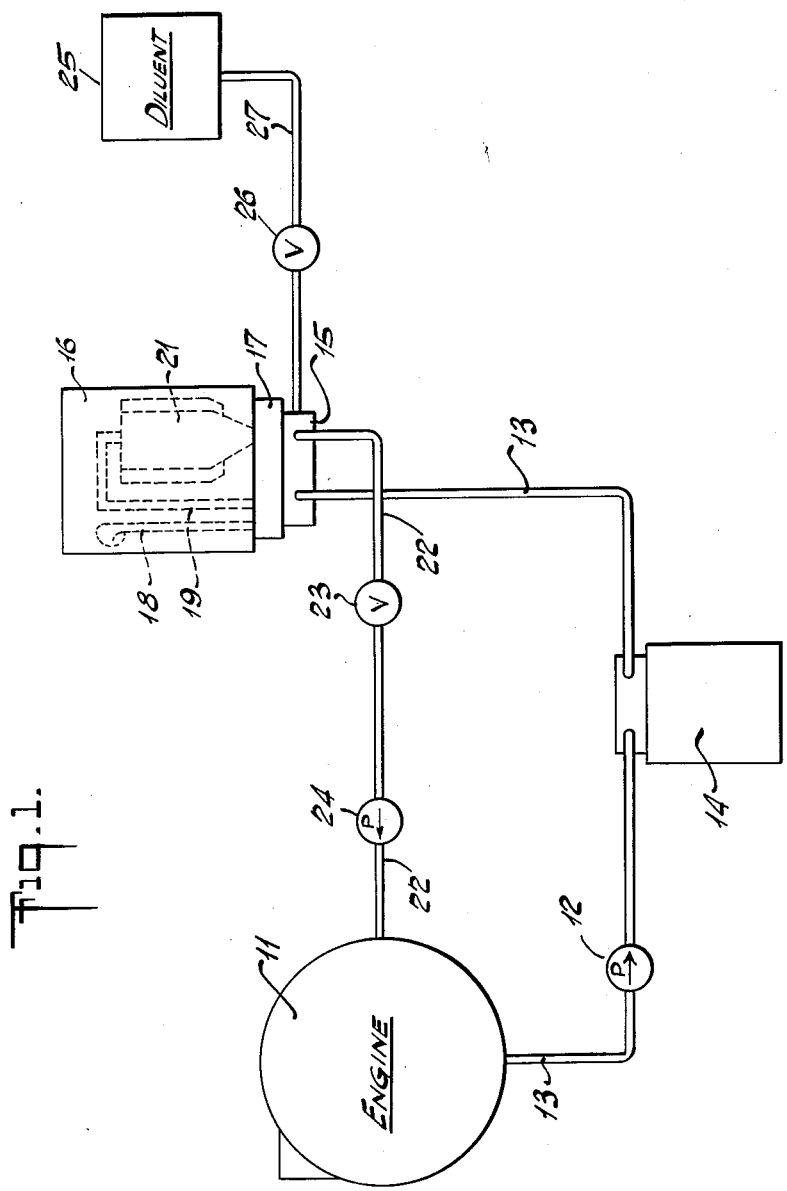
INVENTOR
WALTER H. GEDDES.
BY J. E. Deringer
HIS ATTORNEY

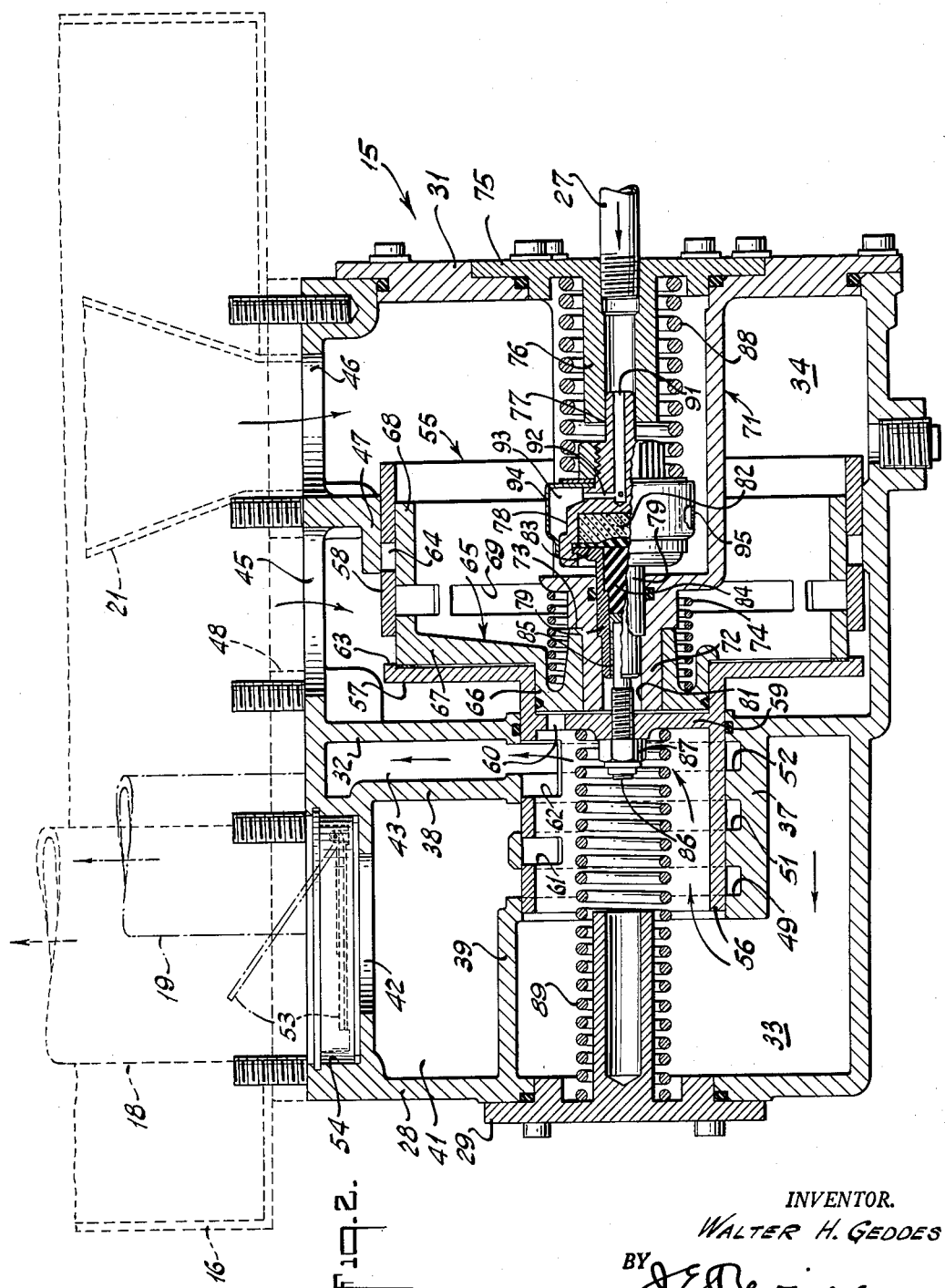

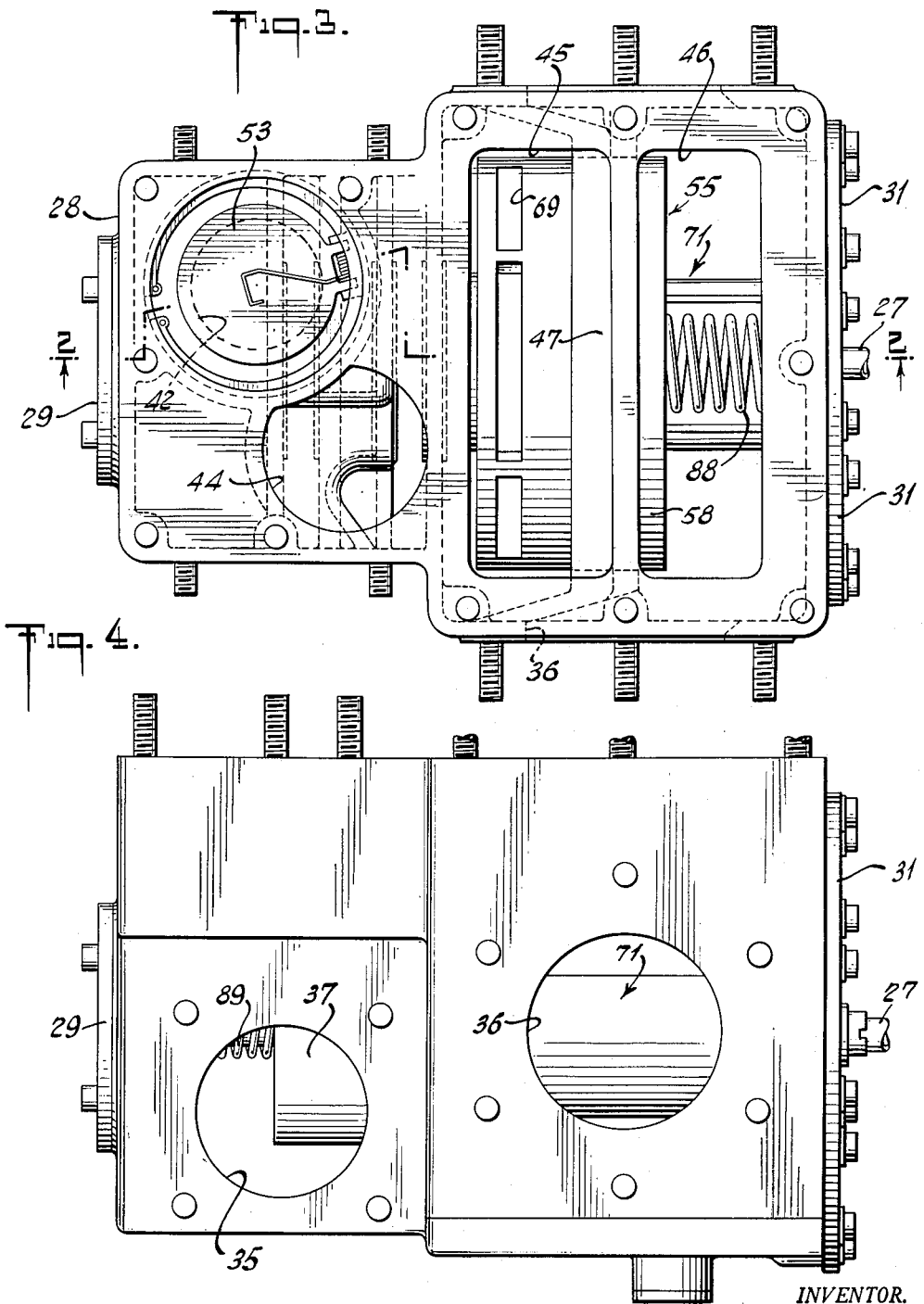

Nov. 29, 1955 W. H. GEDDES 2,725,069
OIL TANK OR LIKE VALVE
Filed Nov. 19, 1951 4 Sheets-Sheet 4
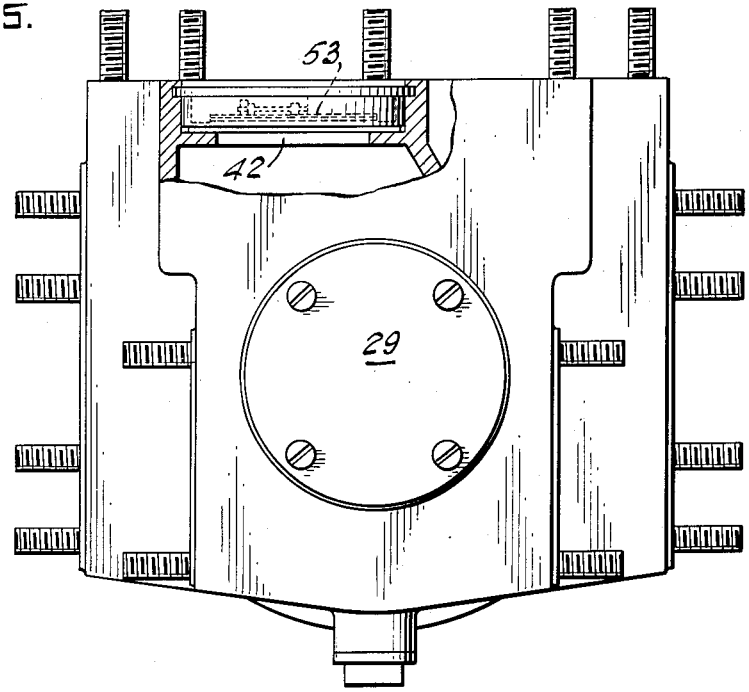
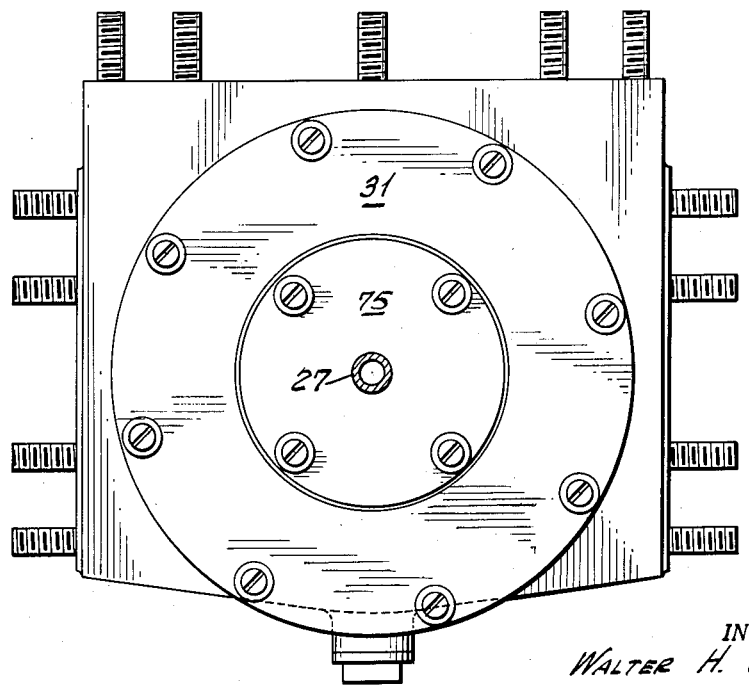
INVENTOR.
WALTER H. GEDDES.
BY J.E.Deringer
His ATTORNEY.

United States Patent Office 2,725,069
Patented Nov. 29, 1955

2,725,069

OIL TANK OR LIKE VALVE

Walter H. Geddes, Dayton, Ohio, assignor to United Aircraft Products, Inc., Dayton, Ohio, a corporation of Ohio Application November 19, 1951, Serial No. 257,163

14 Claims. (Cl. 137—110)

This invention relates to valve assemblies and particularly to controls for effecting diverting and segregating operations in a lubricant circulating system.

In some such systems, particularly aircraft, an oil tank provides a lubricant reservoir and a short circuit path through the reservoir whereby the oil drawn from the engine may be recirculated without having to be mixed with the main body of oil in the tank. This is particularly to be desired in warm-up periods of engine operation and also during dilution, it being unnecessary and undesirable to dilute more than a small amount of the total volume of oil in the system.

It is generally the object of the invention to furnish completely automatic control of oil movements into and out of the tank, and tank by-pass, during warm-up and operating periods, during dilution and when the engine is shut down. Primary response of the automatic controls is to a changing condition of the oil, as, for example, temperature.

A particular object of the invention is to enforce segregation of the diluted and undiluted oils in the system during addition of the diluent, and after the engine has been shut down, irrespective of the condition of the oil to which the automatic controls normally respond.

Other objects and structural details of the invention will appear from the following description when read in connection with the accompanying drawings, wherein:

Fig. 1 is a diagram of an engine lubricant circulating system in which the instant invention may be embodied;

Fig. 2 is a view in longitudinal section of a valve assembly in accordance with the illustrative embodiment of the invention;

Fig. 3 is a top plan view of the valve assembly;

Fig. 4 is a side view of the valve assembly;

Fig. 5 is a view of one end thereof, partly broken away; and

Fig. 6 is a view of the other end of the valve assembly.

Referring to the drawings, in disclosing the invention as embodied in an engine lubricant circulating system, there is shown in Fig. 1 a diagram of such a system having especial application to aircraft. As indicated therein, an engine 11 provides a sump (not shown) in which oil collects after passage through the engine bearings. A scavenger pump 12 draws off the oil as it reaches the sump, directing it by way of return line 13 through an oil cooler 14 to a valve unit 15 on the bottom of an oil tank or reservoir 16. From the valve unit 15 the oil passes through an adapter-sump 17 and is directed alternatively into stand pipes 18 and 19 in the tank 16. The former opens into the top part of the tank, above the normal liquid level. The latter opens into a hopper 21, representing a by-pass or short path through the tank. Through use of the hopper 21 a portion of the lubricant in the system may be circulated to the exclusion of the main body of oil contained in the tank proper, outside the hopper.

From the lower parts of the tank and hopper, the oil descends through the adapter-sump 17 and valve unit 15 and is returned to the engine by way of a supply line 22 in which is positioned a drain valve 23 and a pressure pump 24. According to the conventional mode of operation of such a system, the pumps 12 and 24 are engine driven, their operation being initiated and discontinued in correspondence with the starting and stopping of the engine. Further, it will be understood that the oil returned to the tank is under pressure positively applied by the pump 12 and that the oil leaving the tank en route to the engine is under the influence of an impositively applied suction force generated by the pump 24. At the inlet and outlet sides of the tank, therefore, a pressure differential exists during operation of the engine, the exact value of such pressure difference being a function of a number of variables such as the viscosity of the oil and the resistance to flow offered by the various system lines and passages. When the engine is shut down there is for all practical purposes an absence of pressure in the system.

In cold weather operation there is introduced into the circulating lubricant, prior to stopping the engine, selective amounts of a diluent drawn from a supply tank 25. A valve 26 controls the admission of the diluent which flows through a line 27 connecting the tank 25 to the oil tank valve 15. The diluent may be any light, volatile, relatively non-congealable liquid, for example gasoline. Its mixture with the oil serves to thin the oil and to increase its resistance to cold, that is, to lower the point on the temperature scale at which unheated fluids standing in the lubricant lines will congeal. The diluent in the lubricant is removed by vaporization which follows from a restarting of the engine and consequent heating of the circulating, diluted oil. To conserve diluent, and to obviate a prolonged heating of the oil for vaporization purposes, during addition of the diluent the oil is diverted through the short circuit path represented by the hopper 21. A portion only of the total volume of oil in the system thus is diluted and such portion is segregated from the main body of oil in the tank 16.

The diversion and segregation of the flowing oil is controlled in the valve unit 15. In Fig. 2 such unit is shown in longitudinal section in conjunction with a fragment of the tank 16, the adapter-sump 17 being here omitted for simplicity of disclosure. As shown in Fig. 2, and in Figs. 3–6, the valve unit 15 includes a body 28 interiorly compartmented and having access openings at each end closed by respective caps 29 and 31. A central vertical partition wall 32 in the body 28 divides the interior of the body generally into a main inlet chamber 33 and a main outlet chamber 34. The chamber 33 has an opening 35 (Fig. 4) to receive oil line 13. The chamber 34 has an opening 36 to receive oil line 22. The partition wall 32 has a boss-like projection 37 extending into the chamber 33. From the projection 37 a wall 38 extends radially to the side of the valve body and a wall 39 extends longitudinally to the end thereof. Together the walls 38 and 39 define a chamber 41 opening through a port 42 to the exterior of the valve and chamber 43 opening through a port 44 (Fig. 3) to the exterior of the valve. The main outlet chamber 34 communicates with the exterior of the valve body through the aforementioned opening 36 and also through openings 45 and 46 in side by side relation and separated by an internal rib bearing 47.

The several ports or openings 42, 44, 45 and 46 open through the same side of the valve body 28. In the installation of the valve unit it is bolted or otherwise secured to the underside of the tank 16 with that side of the valve body referred to facing the bottom of the tank. As indicated in Fig. 2, in an installation as described, the ports 42 and 43 communicate respectively with the bottoms of the standpipes 18 and 19, the opening 45 communicates with the bottom of the main part of the tank, as through an opening 48 therein, and the opening 46 communicates with the bottom of the hopper 21.

The chamber 33 is in free communication with the interior of boss 37, through the open end thereof. In the inner surface of the boss are a pair of spaced apart annular grooves 49 and 51 which intersect the wall 39 and provide openings into the chamber 41. Another groove 52 registers with and provides a similar opening into the chamber 43.

In the absence of other considerations, therefore, the oil entering inlet chamber 33 has a choice of flow into the main part of the tank or into the hopper 21. Leaving the tank, the oil returns to valve unit 15 by way of openings 45 and 46 communicating with the main outlet chamber 34. The latter becomes a common outlet means with respect to the tank and hopper.

Reverse flow from the main part of the tank through port 42 to inlet chamber 33 is prevented by a spring biased check valve 53 received in a counterbore 54 in the valve body and in overlying relation to the port 42.

Control of oil flow in the unit is effected by valve means including a valve sleeve 55. The sleeve 55 is made up of a tubular portion 56 slidably mounted in the partition wall 32 and boss 37. Projecting through and beyond wall 32 toward chamber 34, the portion 56 terminates in a radial disc-like wall 57, the periphery of which in turn merges with a skirt portion 58. The portion 58 has a sliding bearing in the aforementioned internal rib 47. Within the tubular portion 56 is a wall 59 tending to complement the wall 32 in separating the chambers 33 and 34 while not interfering with freedom of movement of the valve sleeve. The wall 59 has an opening 60 therein.

Having a sliding fit in the boss 37, the tubular portion 56 of valve sleeve 55 cuts off communication of chamber 33 with chambers 41 and 43, except as such communication may take place through spaced apart annular openings 61 and 62 in portion 56. The opening 61 is relatively narrow and may be closed by being positioned between the grooves 49 and 51. It is used to admit flow into chamber 41 which it normally accomplishes by moving into overlapping or registering relation with groove 49. The opening 62 is approximately twice the width of the opening 61. It is used to admit flow exclusively to the chamber 41 or exclusively to the chamber 43 or to admit flow jointly to both chambers, all according to the longitudinal position of adjustment of the valve sleeve 55.

The skirt portion 58 of sleeve 55 presents spaced apart annular openings 63 and 64 whereby flow may take place from opening 45 through the main outlet chamber 34. Such flow is otherwise precluded by reason of the sliding fit of the skirt 58 in rib bearing 47.

A segregator element 65 has a hub portion 66 received in tubular portion 56 of sleeve 55, to the right of the division wall 59 as viewed in Fig. 2. The element 65 has radial spoke portions 67 terminating in a cylindrical portion 68 having a sliding fit within skirt 58. The portion 68 has a set of circumferential openings 69, and is arranged to seat on the disc portion 57 of the valve sleeve. So seated, the segregator element closes openings 63 and positions the openings 69 between the sets of openings 63 and 64, thus also closing the said openings 64.

The closure cap 31 has an integral inwardly projecting cage 71 terminating in a bushing portion 72 which extends into adjacent coaxial relationship with the wall 59 of valve sleeve 55. The hub 66 of the segregator element 65 has a sliding mounting on the bushing 72, the latter presenting a shoulder 73 limiting movement of the segregator element in one direction. Motion of the segregator element in the opposite direction is limited by engagement of the cylindrical portion 68 thereof with the disc portion 57 of the valve sleeve. A spring 74 is seated on the cage 71 and urges the segregator element 65 toward a position of contact with the valve sleeve disc 57.

The right hand or base end of the cage 71 is open through the cap 31, there being installed in such opening an auxiliary closure cap 75. The cap has an inwardly projecting sleeve bearing 76 open through its inner end and also open at its opposite end through the cap 75. The said opposite end of the bearing 76 receives the pipe line 27 extending from the source of diluent 25 (Fig. 1). The inner end of the said bearing 76 receives the shank 77 of a thermostat case 78. The body of the case 78 is interengaged with the flange of a bushing sleeve 79 which extends into and has a bearing in a longitudinal bore 81 in the bushing portion 72 of cage 71.

Within the case 78 is a pellet 82 of a known material having the property of expansion under applied heat. The pellet 82 is held in contained relation in the case 78 by a diaphragm 83 clamped to a seat in the case 78 by the flange of sleeve 79. Within the sleeve 79, and bearing on the diaphragm 83 on the side opposite pellet 82, is a rubber or rubber-like connector 84. Beyond the connector 84 is a bearing cup 85 within which is seated one end of a stem member 86. The opposite end of member 86 is secured to the partition wall 59 of valve sleeve 55, being in threaded engagement with such wall and carrying a lock nut 87 whereby an adjusted relationship between the wall 59 and stem 86 may be retained.

The thermostat case 78 is in the cage 71. A relatively strong spring 88 is seated on the auxiliary cap 75 and holds case 78 in the position of Fig. 2, overcoming a relatively weaker spring 89 which is seated on the closure cap 29 and bears on partition wall 59.

By reason of its mounting in the cage 71, the thermostat case 78 is exposed to contact with oil flowing through chamber 34 to the outlet 36. An increasing oil temperature heats and expands the pellet 82. Motion of the case 78 rearward or to the right is inhibited by strong spring 88. Accordingly the expansive force of the pellet 82 is applied in a direction to extend the bearing cup 85 and stem 86 outward or to the left, resulting in a shifting of the valve sleeve 55 in the same direction. The spring 89 is utilized to return the valve sleeve 55 in the opposite direction, and to re-compress the pellet 82, in response to a cooling of the oil.

Diluent introduced into the valve unit by way of pipe connection 27 flows through the bearing 76 and into a longitudinal bore 91 in the shank 77 of case 78. From the bore 91 it escapes by way of one or more radial ports 92 into an enclosure 93 defined by a shroud 94 in surrounding, spaced relation to the case 78. Perforations 95 in the shroud 94 allow the diluent to pass out of the enclosure 93 and mix with the oil in chamber 34. As may be noted, the effect of the described construction and arrangement of parts is to bring the diluent into contact with the thermostat case 78 substantially to the exclusion of the oil, during dilution. The thermostat is cooled thereby, with resultant effect upon the valve sleeve 55, irrespective of the temperature of the oil.

The start of an engine operation normally will find the engine oil cold or unheated. The thermostatic pellet 82 accordingly is in an unexpanded condition, and the valve sleeve 55 occupies the position of Fig. 2, under the urging of spring 89. Moreover, there is no appreciable pressure difference between the chambers 33 and 34 when the engine is idle so that the spring 74 is enabled to hold the segregator element 65 to a seat on disc portion 57. When the engine is started, a pressure difference is established, such difference being applied across the segregation element 65 by reason of the opening 60 in wall 59.

The segregator element is held thereby to a seat on shoulder 73, overcoming the spring 74.

With the parts so positioned, oil returning from the engine to the chamber 33 finds annular groove 52 open and annular grooves 49 and 51 closed. Accordingly, the oil flows by way of opening 62, groove 52 and chamber 43 to the outlet 44 from which it may rise in stand pipe 19 in tank 16 and be discharged into the top of hopper 21. Descending through the hopper 21, the oil re-enters valve body 15 by way of opening 46, and, after passing through chamber 34 discharges from outlet 36 and is conducted by pipe line 22 back to the engine.

The circulating oil is warmed by its passage through the engine. In response to such rising temperature the thermal pellet 82 expands and moves the valve sleeve 55 outward, or to the left as seen in Fig. 2, such motion being predetermined to start at some selected temperature value of the oil. The described motion of the valve sleeve is almost immediately effective to open grooves 49 and 51 and permit flow to chamber 41, out opening 42 and through pipe 18 to the main part of the tank. For a continued period of travel of the valve sleeve, representing an intermediate range of temperature values, flow is open to both the chambers 41 and 42. At some predetermined high temperature value, the valve sleeve reaches its limit of outward travel, in which position flow to chamber 43 and the hopper 21 is cut off and all of the circulating oil is constrained to pass to chamber 41 and from thence to the main part of the tank. It will be understood, of course, that if full flow to the tank is blocked, as by congealed oil, the resulting quick increase in pressure drop between the chambers 33 and 34 will shift the entire valve unit inwardly against the urging of spring 88. The valve sleeve 55 will assume a position in which circulation may be continued by way of the hopper while pressure continues to be applied to the tank inlet, this combination of effects ultimately relieving the blocked condition whereupon control of the movements of the valve sleeve is returned to the thermostat.

When the valve sleeve 55 begins to move in response to rising oil temperature, the segregator element 65 tends to follow such motion since it is urged to do so by the spring 74. There being at this time, however, a substantial pressure difference between the chambers 33 and 34, such following motion of the segregator element is inhibited. As a result the valve sleeve moves relatively to the segregator element, opening paths of flow through the front of the element and through radial openings 64 and 69 which tend to overlap and finally to register with one another in the course of movement of the valve sleeve. The opening 45, communicating with the lower part of the tank accordingly is at this time also in communication with the chamber 34 and the outlet 36.

The process of dilution ordinarily is carried out after a period of engine operation, the engine oil at such time being hot and the valve sleeve 55 being as a consequence in position to direct the oil through the tank by way of the main part thereof. When the dilution valve 26 is opened, however, and the diluent begins to flow to the enclosure 93 and out into the oil stream, an overriding effect is exerted upon the thermostat. The diluent is cooler than the oil and contacts the thermostat case 78 substantially to the exclusion of the oil. Thus, irrespective of the temperature of the oil the thermostat is cooled and the valve sleeve 55 is permitted to return to the position of Fig. 2 under the urging of spring 89. While the diluent is being added, therefor, oil flow is by way of the hopper 21, resulting in a segregation of the diluted oil in the engine and in the lines leading to and from the engine from the main body of oil in the tank.

After diluting, the engine ordinarily is shut off. The diluent remains in the oil lines, resisting congelation, until the next engine start when it is vaporized during the warm up period. It is desirable to stop the engine immediately that the percentage dilution wanted is attained. Otherwise continued operation of the engine will boil off or vaporize some of the diluent. This practice, however, tends to produce unsatisfactory segregation since the still hot oil expands the thermostat, moving the valve sleeve 55 outward and tending to open communication between the lower part of the tank and the chamber 34. Undiluted, relatively heavy oil from the tank could in this circumstance flow by gravity into the oil lines, thus losing some of the protection against congealing that it is the object of dilution to provide. According to the instant invention this mixture of the undiluted with the diluted, after engine shut down, is precluded by reason of the pressure responsive mounting of the segregator element 65. Thus, as has already been noted, when the engine is idle and there is no appreciable pressure difference between the chambers 33 and 34, the segregator element is under the influence of spring 74. As a result the element 65 occupies a seated position on the disc 57, closing communication between opening 45 and chamber 34, throughout any extending and retracting movements of the valve sleeve 55.

What is claimed is:

1. An oil tank assembly, comprising a main tank and a hopper associated therewith, separate entry paths to said tank and to said hopper, outlet means establishing communication between the lower parts of the tank and hopper, a part having motion in response to a changing condition of the oil, valve means controlling flow from the lower part of said main tank through said outlet means including a first element connected to said part for motion therewith and a second element carried by said first element but movable relatively thereto, said first and second elements having relative positions of adjustment wherein flow from the lower part of the tank respectively is permitted and denied, means for applying oil pressure to said second element in a manner to hold it stationary relative to said first element, and a spring subordinate in strength to said oil pressure urging said second element to a following relationship with said first element.

2. An oil tank assembly, comprising an inlet thereto, a main tank and a hopper associated with said main tank, separate entry paths from said inlet to said tank and to said hopper, outlet means establishing communication between the lower parts of said main tank and hopper, a movable valve element between one of said main tank or hopper and said outlet means exposed on its opposite sides to the fluid pressures at said inlet and said outlet means, a spring urging said valve element to one control position, said spring being overcome and said valve element being moved to another control position by a predetermined high pressure differential between said inlet and said outlet means, and a part cooperable with said valve element to define an alternatively open and closed path of flow to said outlet means and means responsive to a changing condition of the flowing oil for moving said part, said part and said valve element moving in unison when said valve element is in said one control position and said part moving relatively to said valve element when said element is in said other position.

3. A valve assembly comprising a body presenting inlet and outlet chambers, said inlet chamber receiving fluid under pressure, separate outlet openings from said inlet chamber, separate inlet openings to said outlet chamber, an opening in said body communicating said inlet and outlet chambers with one another, a valve unit installed in and closing said body opening said unit including a cylindrical portion in said inlet chamber adjustable to control flow through said outlet openings and further including means in said outlet chamber responsive to a changing condition of the oil for adjusting said cylindrical portion, and other valve means controlling flow through one of said inlet openings, said other valve means including a disc movable with said cylindrical portion and a cooperating valve element spring urged into engagement with said disc to effect a valve closure, there being an opening in said valve unit for applying the pressure difference between said inlet chamber and said outlet chamber across said valve element in opposition to the spring force acting thereon.

4. A valve assembly comprising a body presenting a partition wall defining inlet and outlet chambers, said inlet chamber receiving fluid under pressure, separate outlet openings from said inlet chamber, separate inlet openings to said outlet chamber, a valve unit having a portion slidably mounted in said partition wall and controlling flow through said outlets and another portion in said outlet chamber movable with the first said portion, a segregator element having a floating mounting relative to said other portion of the valve unit and engageable therewith to define a valve closure denying flow into said outlet chamber by way of one of said inlet openings, yielding means urging said segregator element toward engagement with said other portion, an opening in said valve unit for applying the pressure difference between said inlet chamber and said outlet chamber across said segregator element in opposition to said yielding means, relative movement of said other portion and said segregator under said pressure difference opening the said valve closure to permit flow into said outlet chamber by way of said one inlet opening, and means responsive to a changing condition of the oil for moving said valve unit.

5. A valve assembly comprising a body presenting a partition wall defining inlet and outlet chambers, an opening in said partition wall, a valve sleeve slidably received in said opening, a housing in concentric relation to said sleeve and stationarily mounted in said outlet chamber, a thermostat supported by said housing and connected to said sleeve, a cylindrical extension on said valve sleeve in said outlet chamber, said extension having radial openings, a segregator element received in said cylindrical extension, a spring urging said element to a seat in said extension closing said radial openings, an opening through said valve sleeve to said segregator element for applying the pressure difference between said inlet chamber and said outlet chamber across said segregator element in opposition to said spring, relative movement of said segregator element and said cylindrical extension under said pressure difference opening the radial openings in said extension, outlet openings from said inlet chamber, and inlet openings into said outlet chamber, said thermostat adjusting said valve sleeve to control flow through said inlet openings and said cylindrical extension and said segregator element cooperating to control flow into said outlet chamber by way of one of said inlet openings.

6. A valve assembly for controlling fluid flow through dual paths, said valve assembly comprising a valve body having inlet and outlet chambers formed therein, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively, and a sixth port providing an outlet for said outlet chamber, valve means for regulating fluid flow through said second, third and fourth ports, said valve means including a diverter valve and a segregator valve mounted for co-axial relative movement in said valve body, said diverter valve having a valve face positioned in said inlet chamber in cooperative relation with said second and third ports to vary, by its axial movement, the distribution of fluid flow between said second and third ports, said diverter and segregator valves having cooperating valve faces positioned in said outlet chamber adjacent to said fourth port to regulate, by relative axial movement of said diverter and said segregator valve, the fluid flow through said fourth port and spring means operatively associated with said diverter and segregator valves and biased to urge said diverter and segregator valves together to close said fourth port, the opposite sides of said segregator valve being exposed to fluid pressures in said inlet and outlet chambers respectively whereby a differential pressure in said inlet and outlet chambers tends to urge said diverter and segregator valves apart to open said fourth port.

7. A valve assembly for controlling fluid flow through dual paths, said valve assembly comprising a valve body having inlet and outlet chambers formed therein, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively, and a sixth port providing an outlet for said outlet chamber, valve means for regulating fluid flow to said second, third and fourth ports, said valve means including a diverter valve and a segregator valve mounted for co-axial relative movement in said valve body, said diverter valve having a valve face positioned in said inlet chamber in cooperative relation with said second and third ports to vary, by its axial movement the distribution of fluid flow between said second and third ports, said diverter and segregator valves having cooperative valve faces positioned in said outlet chamber adjacent to said fourth port to regulate, by relative axial movement of said diverter and segregator valves, the fluid flow through said fourth port, a thermostat mounted in said outlet chamber in co-axial relation with said segregator and diverter valves, said thermostat being operatively connected to said diverter valve, whereby variations in temperature of the fluid in said outlet chamber cause said thermostat to move said diverter valve with respect to said segregator valve and thereby vary simultaneously the relative degree opening of said second and third ports and the degree of opening of said fourth port.

8. A valve assembly for controlling fluid flow through dual paths, said valve assembly comprising a valve body having an internal partition forming inlet and outlet chambers in said valve body, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively, and a sixth port providing an outlet for said outlet chamber, valve means for regulating fluid flow to said second, third and fourth ports, said valve means including a diverter valve having a sleeve portion extending through said partition and mounted for axial movement therethrough, said diverter valve sleeve having a first valve face positioned in said inlet chamber in cooperative relation with said second and third ports to vary by its axial movement the distribution of fluid flow between said second and third ports, said diverter valve sleeve also having a second valve face located within said outlet chamber, a segregator valve mounted within said diverter valve sleeve for axial movement with respect thereto, said segregator valve having a valve face positioned to co-operate with said second valve face of said diverter valve sleeve to regulate the degree of opening of said fourth port.

9. A valve assembly for controlling fluid flow through dual paths, said valve assembly comprising a valve body having an internal partition forming inlet and outlet chambers within said valve body, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively and a sixth port providing an outlet for said outlet chamber, valve means for regulating fluid flow to said second, third and fourth ports, said valve means including a diverter valve comprising a sleeve extending through said partition and axially movable therein, said diverter valve sleeve having a first valve face positioned in said inlet chamber in cooperative relation with said second and third ports to vary by its axial movement the distribution of fluid flow between said second and third ports, said diverter valve sleeve also having a second valve face within said outlet chamber, said diverter valve having an internal transverse partition defining with said diverter valve sleeve a cylindrical chamber, a segregator valve coaxial with said diverter valve and mounted for sliding movement within said cylindrical chamber, said segregator valve having a valve face positioned to cooperate with the second valve face of said diverter valve sleeve and with said fourth port to vary the degree of opening of said fourth port, and spring means operatively associated with said segregator valve and biased to urge said valve toward said diverter valve partition, said diverter valve partition being provided with an opening therethrough, whereby said segregator valve is responsive to the pressure in said inlet chamber.

10. A valve assembly for controlling fluid flow through dual paths, said valve assembly comprising a valve body having inlet and outlet chambers formed therein, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively, and a sixth port providing an outlet from said outlet chamber, a bracket within said outlet chamber, a thermostat mounted in said bracket and having an arm extending into said inlet chamber, said arm being axially movable by said thermostat in response to temperature changes in said outlet chamber, first spring means interposed between said thermostat and a wall of said outlet chamber and biased to urge said thermostat toward said inlet chamber, said bracket being provided with a stop to limit movement of said thermostat by said spring means, valve means including a diverter valve and a segregator valve mounted for co-axial relative movement in said valve body, said diverter valve having a valve face positioned in said inlet chamber in cooperative relation with said second and third ports to vary by its axial movement the distribution of fluid flow between said second and third ports, said diverter valve being connected to said thermostat arm, said diverter and segregator valves having cooperating valve faces positioned in said outlet chamber adjacent to said fourth port to regulate by relative axial movement of said diverter and segregator valves the fluid flow through said fourth port, second spring means interposed between said diverter valve and a wall of said inlet chamber and biased to urge said diverter valve toward said segregator valve, and third spring means interposed between said segregator valve and said bracket to urge said segregator valve toward said diverter valve, said segregator valve being exposed on its opposite sides to the pressures in said inlet and outlet chambers respectively and said third spring means being relatively weaker than said second spring means, whereby a differential pressure between said inlet and outlet chambers tends to urge said segregator valve away from said diverter valve to open said fourth port.

11. A valve unit for controlling flow through an oil tank having a hopper and a main storage compartment; characterized by a body presenting main inlet and outlet chambers, said inlet chamber receiving oil under pressure, an inlet opening to said hopper from said inlet chamber, separate outlet openings from said hopper and compartment to said outlet chamber, a valve controlling flow into said outlet chamber from said main storage compartment, said valve being normally closed, and means for applying the pressure difference between said inlet chamber and said outlet chamber across said valve in a direction for opening said valve.

12. A valve unit according to claim 11, characterized in that said inlet and outlet chambers are in side by side adjacent relation separated by a wall in said body, said last named means including a relatively small diameter opening in said wall.

13. A valve unit for use with an oil tank having a main storage compartment and a hopper therein; characterized by a body presenting inlet and outlet chambers, the former communicating with said hopper and the latter being in common communication with said storage compartment and said hopper, valve means controlling flow from the storage compartment through said outlet means, said valve means being normally closed, and means for applying the pressure difference between said inlet chamber and said outlet chamber across said valve in a direction for opening said valve means.

14. An oil tank assembly, including a main tank and a hopper within said main tank, inlet means conducting oil to the top of said hopper, outlet means establishing communication between the lower parts of the tank and hopper, pressure responsive normally closed valve means controlling flow from the lower part of said main tank through said outlet means, and means for applying the present difference between said inlet means and said outlet means across said valve means in a direction for opening said valve means.

References Cited in the file of this patent

UNITED STATES PATENTS

| | | |
|---|---|---|
| 2,288,599 | Ramsaur | July 7, 1942 |
| 2,389,555 | Sharples | Nov. 20, 1945 |
| 2,405,831 | Jensen | Aug. 13, 1946 |
| 2,436,513 | Hostetter | Feb. 24, 1948 |
| 2,480,676 | Shaw | Aug. 30, 1949 |
| 2,507,384 | Schneck | May 9, 1950 |
| 2,510,473 | Jensen | June 6, 1950 |
| 2,584,877 | Hoffman et al. | Feb. 5, 1952 |
| 2,588,778 | Tibeau | Mar. 11, 1952 |
| 2,601,868 | Gill | July 1, 1952 |
| 2,689,712 | Booth | Sept. 21, 1954 |